3,046,259
PROCESS FOR WATER SOLUBLE POLYMER RECOVERY

Irwin H. Hess, White Plains, N.Y., and Kerwin K. Kurtz, Whippany, N.J., assignor to American Cyanamid Company, New York, N.Y., a corporation of Maine
No Drawing. Filed Oct. 14, 1957, Ser. No. 689,757
11 Claims. (Cl. 260—80)

This invention relates to a process for recovering water-soluble polymers from their aqueous dispersions and more particularly this invention relates to a process for recovering water-soluble polymers of compounds containing a polymerizable $CH_2=C<$ group from aqueous dispersions or solutions thereof, which process is accomplished by the use of a certain class of precipitating agents in a particular way. Still further, this invention relates to a process for removing water-soluble polymers from water by precipitating said polymers from solution, removing the precipitated polymer and drying.

One of the objects of the present invention is to remove water-soluble polymers in the form of fine discrete particles from aqueous dispersions thereof. A further object of the present invention is to recover a substantially dry, water-soluble polymeric material in solid from from aqueous dispersions thereof. These and other objects of the present invention will be discussed in greater detail hereinbelow.

In the manufacture of water-soluble polymeric materials, such as polyacrylamide, the polymerization of a vinylidene compound such as acrylamide is carried out in an aqueous medium. Oftentimes, the concentration of monomer in solution is relatively small in the order of magnitude of about 5%–20%. After polymerization is substantially completed, the water-soluble polymer remains in solution but it is not present in a very substantial concentration. It is commercially inefficient and undesirable to try to remove said water-soluble polymer from its aqueous medium by conventional means such as simple distillation. On the other hand, such aqueous solutions of the polymeric material are not easily handleable especially for shipping purposes inasmuch as sizeable quantities of water such as 90%–95% may well have to be shipped in order to transmit 5 to 10% of the polymeric material. It is then obviously desirable to find a suitable means for removing the polymeric material from its aqueous medium in such a way as to produce a dry solid polymeric material which is substantially free of water and which is in the form of small discrete particles. It is known that water-soluble polymeric materials can be removed from aqueous solution by introducing the same into a precipitating agent. When the viscosity of the aqueous solution or dispersion of the polymeric material is relatively high, the introduction of such viscous solution into a precipitating agent results in the precipitation of large agglomerates which are not desirable commercially. We have found that aqueous solutions or dispersions of water-soluble polymeric materials can be diluted with a precipitating agent in an amount sufficient to reduce the viscosity of the dispersion to a point where it may then be introduced into a further quantity of the precipitating agent to precipitate out finely divided discrete particles without producing large sticky agglomerates. The amount of precipitating agent first used must be sufficient to so reduce the viscosity but should be insufficient to precipitate the polymer from solution. After the initial viscosity has been reduced sufficiently without precipitation of polymeric material therefrom, the treated solution is then introduced into a larger quantity of the same or a different precipitating agent in a quantity sufficient to precipitate out substantially all of the polymeric material. Alternatively, the treated solution may be diluted by introducing a larger quantity of a precipitating agent into said treated solution in a quantity sufficient to precipitate the polymer from solution.

These precipitating agents are characterized by the fact that they are at least partially soluble in water, are inert to said polymeric material inasmuch as it does not enter into any reaction with said polymeric material nor alter its chemical properties in any way. Finally, the precipitating agent must be of such a character that the polymeric material is substantially insoluble therein. The precipitating agent must be miscible with water or only partially soluble therein. If the precipitating agent has only a limited solubility in water, the aqueous solution of said precipitating agent prior to complete saturation or at most upon complete saturation prior to the formation of a two-phase system should be a non-solvent for the polymeric material, and as a consequence, the polymeric material must precipitate out of said aqueous solution at some point prior to the formation of the two-phase system between the water and the partially soluble precipitating agent. The aqueous solution of the polymeric material at the outset will generally be a viscous solution and as the precipitating agent is added, there will be formed locally cloudy dispersions of polymer indicating localized precipitation. Upon agitation resulting in distribution of the precipitating agent throughout the entire aqueous solution of the polymer, this cloudy area disappears. As a consequence, agitation of the aqueous solution of the polymeric material during the addition of the precipitating agent will advantageously distribute all of the materials into a homogeneous solution. The speed of agitation can be geared to the addition of the precipitating agent. If the agitation is slow, the precipitating agent addition should be in relatively small quantities. If the precipitating agent is added in large quantities at a given time, the agitation should be vigorous. It is possible to dilute the aqueous solution of the polymeric material with water prior to the addition of the precipitating agent in order to reduce the viscosity of the polymeric solution, but this will only require the addition of larger quantities of the precipitating agent ultimately, and as a consequence, should be avoided. The precipitating agent should be added to the aqueous solution of the polymeric material with agitation in gradual controlled amounts until the first permanent cloudiness begins to appear. If upon the addition of no further amounts of the precipitating agent, this cloudiness does not dissipate upon continued agitation, the aqueous solution of the polymeric material is then ready for the addition of the larger quantities of the precipitating agent so as to cause substantially complete precipitation of the polymeric material as fine discrete particles. One may stop the addition of the precipitating agent at any point short of the first signs of permanent cloudiness, but this will result ultimately in the precipitation of particles of larger size. The agitation means should be located in the near vicinity of the addition point of the precipitating agent and must be sufficient to cause redissolution of the polymer which is precipitated upon first contact of the precipitating agent with the polymer solution. Local precipitation should be kept to a minimum by adjusting the degree of agitation and/or by adjusting the rate of addition of the initial portions of the precipitating agent. It has been indicated hereinabove that the precipitating agent used in the first step may be the same or different from the precipitated agent used in the second step. It is highly preferred, however, that the same precipitating agent be used in each successive step. This is advantageous commercially because the precipitating agent can be recycled and after due purification can be used over and over again. The use of two different precipitating agents, of course, would result in the use of a mixed precipitating agent on recycling or a separation by distillation step.

Among the precipitating agents which may be used in the practice of the process of the present invention are the ketones such as acetone, methylethyl ketone, diethyl ketone, or the aliphatic monohydric alcohols such as methanol, ethanol, propanol, isopropanol and the like, or the ethers such as dimethyl ether, methylethyl ether, diethyl ether and the like, dioxane, morpholine, the glycol mono and/or diethers, such as ethylene glycol monoethyl ether, ethylene glycol monobutyl ether, ethylene glycol monomethyl ether, diethylene glycol monoethyl ether, ethylene glycol diethyl ether, diethylene glycol dimethyl ether, or the glycol ether esters such as ethylene glycol monomethylether acetate and the like. Esters like ethyl acetate may be used.

Among the water-soluble polymers in aqueous solution which may be treated in accordance with the process of the present invention are polymers and copolymers of acrylamide, acrylic acid and salts thereof, such as sodium acrylate, potassium acrylate, lithium acrylate, ammonium acrylate, and the like; polymers containing vinyl alcohol, vinyl sulphonate units and salts thereof and the like. When these polymeric materials are prepared as homopolymers or as copolymers with one another, the resulting polymeric material is water-soluble. When these monomeric materials are copolymerized with other polymerizable compounds containing a $CH_2=C<$ group, water-soluble polymers are produced when substantial quantities of the former materials are used. Illustrative of polymerizable monomers which may be used with the monomers set forth hereinabove but in less than major amounts of the total copolymer are styrene, ring-substituted alkyl styrenes such as orthomethyl styrene, metamethyl styrene, paramethylstyrene, 2,4-dimethyl styrene, 2,5-dimethyl styrene, 3,4-dimethyl styrene, or the higher monoalkyl or polyalkyl ring-substituted styrenes including the ethyl, propyl, butyl and the like. Additionally, one can make use of the nitriles such as acrylonitrile, methacrylonitrile, ethacrylonitrile, alphachloro acrylonitrile and the like. Still further, one can make use of the esters of acrylic acids such as methyl acrylate, ethyl acrylate, butyl acrylate, methylmethacrylate, ethylmethacrylate and the like. Still further, one could make use of the ring-substituted halostyrenes such as ortho, meta or para chlorostyrene, 2,4-dichlorostyrene, 2,5-dichlorostyrene and the like. It should be remembered that the use of these latter monomers, namely, the styrenes, the nitriles, the acrylates and the like, when used to form copolymers with the acrylamides, acrylic acids and the salts thereof and the like, should be used in minor amounts so as not to produce water-insoluble polymers. If the polymer produced is water-insoluble, the present invention is not applicable thereto.

As these polymeric materials are initially prepared, the solution thereof on completion of polymerization is generally hot. The hot solution may be treated immediately if desired or it may be permitted to cool, or may be cooled to room temperature before carrying out the process of the present invention. The temperature at which the first dilution takes place is not critical. It is required, however, that the precipitating agent be used in exactly the right amount to decrease the viscosity of the aqueous solution sufficiently so that it may then be distributed into a larger amount of precipitating agent without the formation of large sticky agglomerates and yet, the initial amount of precipitating agent used should not be sufficient to permit any significant precipitation of the polymeric material out of solution. This initial amount of precipitating agent used will depend and will vary with the concentration of polymer in solution and/or the type of polymer in solution. If one has a 10% solution of a polyacrylamide, one should dilute said solution with a precipitating agent such as methanol in an amount not appreciably less than about 5% by weight based on the total weight of water nor more than about 66% methanol based on the total weight of the water.

The process of the present invention is applicable to aqueous solutions of water-soluble polymers having a molecular weight varying over a fairly wide range. For instance, it is applicable to polymers having molecular weight between about 50,000 and 5,000,000 wherein the molecular weight of the higher polymers is a weight average molecular weight. When using polymeric materials having higher molecular weights such as those between about 100,000 and 5,000,000 or even higher, the weight average molecular weight can be determined by the light scattering method. Cf. P. J. Flory, Principles of Polymer Chemistry, Cornell University Press, 1953, pages 256–316. In determining the molecular weight of lower polymers, the osmotic pressure method may be used. Polymers having molecular weight below 50,000 can readily be treated by the process of the present invention down to and including dimers of the polymerizable monomers.

The concentration of the polymer in the aqueous solution may vary over a fairly wide range depending upon the concentration of the monomer in solution as prepared. This range may vary between about 1% and 80% by weight based on the total weight of solution. For most practical purposes, this inventive concept will be applicable to polymeric solutions having a concentration between about 10 and 20% by weight based on the total weight of solution.

In carrying out the second step of the process of the present invention, namely, the introduction of the dilute polymeric solution into the large quantity of precipitating agent, the temperature is not critical. One may operate at temperatures between about 0° C. and just under the boiling point of the precipitating agent. Preferably, however, and for economic reasons, it is more desirable to operate between about 10° C. and 60° C. in the preparation of the final precipitated polymer. During the first and second steps of the instant process, it is desirable that there be at least some measure of agitation in order that in the first instance a homogeneous uniform blend of polymeric solution and precipitating agent is prepared and in the second instance, in order that the polymer may be substantially completely precipitated out of solution. This agitation can be accomplished by use of conventional blenders or stirring equipment, centrifugal pumps, colloid mills, homogenizers and the like. Since sub-atmospheric pressure or super-atmospheric pressure is unnecessary in carrying out the process of the present invention, conventional atmospheric pressure is generally recommended.

In the precipitating step, it is sometimes desirable and frequently helpful to make use of an electrolytic material such as potassium hydroxide, sodium hydroxide, nitric acid, hydrochloric acid, sodium chloride, potassium chloride and the like. The use of such materials will have an electrolytic effect on the precipitating polymer sometimes referred to as a salting out effect.

After the polymeric material has been precipitated out of solution, any conventional mechanical means may be used to separate the precipitated polymer from the residual fluid comprising the solvent in which the polymer was once dissolved and the precipitating agent in which the polymer is insoluble. One can use such mechanical means as filtering, decanting or centrifuging.

After the precipitated polymeric material has been mechanically separated from its residual fluid, the polymeric material may be washed with additional quantities of the precipitating agent and oven-dried or dried in a hot air heater or a drying kiln.

In order that the concept of the present invention may be more completely understood, the following examples are set forth in which all parts are parts by weight unless otherwise indicated. These examples are set forth primarily for the purpose of illustration and any specific enumeration of detail contained therein should not be

Example 1

Into a suitable reaction vessel equipped with a stirrer, there is introduced 496 parts of a 5.46% aqueous solution of polyacrylamide having a Brookfield viscosity of 32,000 centipoises at 25° C. To this charge, there is then slowly added 210 parts of methanol and 0.47 part of a 70% nitric acid solution while agitating the entire mixture. The amount of methanol added was the maximum amount that could be added without precipitating the polymer. When the methanol is completely dispersed in the polymer solution, there is then added rapidly 816 parts of methanol in order to precipitate the polymer. The batch is then filtered in order to remove the polymer in the form of fine discrete particles.

Example 2

Into a suitable reaction vessel equipped as before, there is introduced 1 part of a 13.5% aqueous solution of polyvinyl alcohol having a viscosity of 105 centipoises. To this charge there is then slowly added with constant agitation 0.6 part of acetone. After all of the acetone is blended in, there is added rapidly with constant agitation 2.9 parts of acetone to precipitate the polymer which is then filtered to recover the polymeric material.

Example 3

Into a suitable reaction vessel equipped as before, there is introduced 1 part of a 13.5% aqueous solution of polyvinyl alcohol having a viscosity of 105 centipoises followed by the slow addition with constant agitation of 0.8 part of isopropanol. Thereafter, there is added rapidly, with constant agitation, 4.2 parts of isopropanol in order to precipitate the polymeric material which is then recovered by filtration.

Example 4

Into a suitable reaction vessel equipped as before, there is introduced 1 part of a 10% aqueous solution of polyvinyl alcohol having a viscosity of 3050 centipoises at room temperature. There is then added, slowly with constant agitation, 1 part of methanol. When the added methanol is completely dispersed, there is then added rapidly 2 parts of methanol to precipitate the polymer which is then recovered by filtration.

Example 5

Into a suitable reaction vessel equipped as before, there is introduced 1 part of a 10% aqueous solution of polyvinyl alcohol at room temperature having a viscosity of 3050 centipoises and to this charge there is then added slowly, while constant agitating, 0.95 part of acetone. When the added acetone is completely dispersed in the polymer solution, there is then added rapidly 2 parts of acetone to precipitate the polymer which is recovered by filtration.

Example 6

Into a suitable reaction vessel equipped as before, there is introduced 1 part of a 15% solution of sodium polyacrylate having a viscosity of about 25,000 centipoises at 25° C. To the charge, there is added slowly 0.5 part of methanol with constant agitation and when the methanol is substantially completely dispersed, there is added rapidly 2.0 parts of methanol in order to precipitate the polymer which is then recovered by filtration.

Example 7

Into a suitable reaction vessel equipped as before, there is introduced 10 parts of a 15% aqueous solution of sodium polyacrylate having a viscosity of about 25,000 centipoises at 25° C. and there is slowly added thereto, 5 parts of acetone with constant agitation. Thereupon, there is added rapidly 20 parts of acetone in order to precipitate the polymer which is then recovered by filtration.

Example 8

Into a suitable reaction vessel equipped as before, there is introduced 1 part of a 10% aqueous solution of a copolymer of acrylamide and diallyl dimethyl ammonium chloride having a viscosity of 23,000 centipoises at 25° C. To this charge, while constantly agitating, there is added slowly 0.75 part of methanol. Thereupon, there is added rapidly 1.75 parts of methanol in order to precipitate the copolymer which is then recovered by filtration.

Example 9

Into a suitable reaction vessel equipped as before, there is introduced 1 part of a 10% aqueous solution of a copolymer of acrylamide and diallyl dimethyl ammonium chloride having a viscosity of 23,000 centipoises, Brookfield, at 25° C. To the charge, while constantly agitating, there is added slowly 0.4 part of acetone. When the acetone is substantially completely dispersed in the polymer solution, thereby reducing the viscosity, there is added rapidly 1.6 parts of acetone in order to precipitate the polymer which is then recovered by filtration.

Example 10

Into a suitable reaction vessel equipped as before, there is introduced 1 part of a 10% aqueous solution of a copolymer of acrylamide and diallyl dimethyl ammonium chloride having a viscosity of 23,000 centipoises at 25° C. To this charge, while constantly agitating, there is then added slowly 0.5 part of 2-B alcohol. Thereafter, there is added rapidly 2.0 parts of 2-B alcohol in order to precipitate the polymer which is then recovered by filtration.

Example 11

Into a suitable reaction vessel equipped as before, there is introduced 1 part of an 8% aqueous solution of polyacrylamide having a viscosity of about 700,000 centipoises, Brookfield, at 25° C. To this charge, while constantly agitating, there is added slowly 0.3 part of methanol. Thereupon, there is added rapidly 1.7 parts of methanol in order to precipitate the polymer.

Example 12

Into a suitable reaction vessel equipped as before, there is introduced 1 part of an 8% aqueous solution of polyacrylamide having a viscosity of about 700,000 centipoises at room temperature to which there is added slowly, with constant agitation, 0.5 part of acetone. When the acetone is substantially completely dispersed in the polymer solution, there is then added rapidly 2.0 parts of acetone in order to precipitate the polymer.

Example 13

Into a suitable reaction vessel equipped as before, there is introduced 1 part of a 12.5% aqueous solution of polyacrylamide having a viscosity of about 30,000 centipoises and to said solution, there is slowly added, while constantly agitating, 0.55 part of methanol. Thereupon, there is added rapidly 3.0 parts of methanol in order to precipitate the polymer.

Example 14

Into a suitable reaction vessel equipped as before, there is introduced a 12.5% aqueous solution of polyacrylamide having a viscosity of about 30,000 centipoises at 25° C. to which there is then slowly added, while constantly agitating, 0.4 part of isopropanol. When the isopropanol is completely dispersed, there is then added rapidly 2.6 parts of isopropanol to effect precipitation of the polymer which is then separated by filtration.

Example 15

Into a suitable reaction vessel, equipped as before, there is introduced 1 part of a 20% aqueous solution of a copolymer of acrylamide and acrylic acid having a viscosity of about 35,000 centipoises at room temperature. To this charge, while constantly agitating, there is slowly added 1.2 parts of methanol. When the methanol is completely dispersed in the copolymer solution, the diluted copolymer solution with reduced viscosity is then added rapidly to 2.8 parts of methanol in order to precipitate the copolymer which is then separated from the filtrate by filtration.

Example 16

Into a suitable reaction vessel equipped as before, there is introduced 1 part of a 20% aqueous solution of a copolymer of acrylamide and acrylic acid having a viscosity of 35,000 centipoises at room temperature. To this charge, while constantly agitating, there is slowly added 0.55 part of acetone. Thereupon, there is added rapidly 3.0 parts of acetone to precipitate the polymer which is then recovered by filtration.

Example 17

Into a suitable reaction vessel equipped as before, there is introduced 1 part of a 20% aqueous solution of a copolymer of acrylamide and acrylic acid having a viscosity of 35,000 centipoises at room temperature. To this charge, while constantly agitating, there is then added slowly 0.5 part of isopropanol. Thereupon, there is added rapidly 2.5 parts of isopropanol in order to precipitate the polymer which is then recovered by filtration.

We claim:

1. A process for recovering a water-soluble addition polymer of a polymerizable compound containing a $CH_2=C<$ group from an aqueous solution thereof comprising
   (1) blending said aqueous solution with an organic precipitating agent, at a temperature between about 0° C. and a temperature just below the boiling point of said precipitating agent, in an amount sufficient to reduce the viscosity of said solution and to produce a permanent uniform cloudiness throughout the medium, which cloudiness does not dissipate on continuous agitation, but not in an amount sufficient to precipitate said polymer therefrom,
   (2) diluting the blend thus prepared with a further quantity of an organic precipitating agent in an amount sufficient to precipitate the polymer in the form of fine discrete particles,
   (3) separating the solid precipitated polymer from the residual fluid, and
   (4) drying the separated polymer, wherein said precipitating agent is at least partially soluble in water, inert to said polymer and in which said polymer is substantially insoluble and wherein said aqueous solution of said precipitating agent is a non-solvent for said polymer at a concentration up to and including saturation.

2. A process for recovering a water-soluble addition polymer of a polymerizable compound containing a $CH_2=C<$ group from an aqueous solution thereof comprising
   (1) blending said aqueous solution with an organic precipitating agent, at a temperature between about 0° C. and a temperature just below the boiling point of said precipitating agent, in an amount sufficient to reduce the viscosity of said solution and to produce a permanent uniform cloudiness throughout the medium, which cloudiness does not dissipate on continuous agitation, but not in an amount sufficient to precipitate said polymer therefrom,
   (2) diluting the blend thus prepared with a further quantity of an organic precipitating agent in an amount sufficient to precipitate the polymer in the form of fine discrete particles,
   (3) filtering the solid precipitated polymer from the residual fluid, and
   (4) drying the filtered polymer, wherein said precipitating agent is at least partially soluble in water, inert to said polymer and in which said polymer is substantially insoluble and wherein said aqueous solution of said precipitating agent is non-solvent for said polymer at a concentration up to and including saturation.

3. A process for recovering a water-soluble addition polymer of acrylamide from an aqueous solution thereof comprising
   (1) blending said aqueous solution with an organic precipitating agent, at a temperature between about 0° C. and a temperature just below the boiling point of said precipitating agent, in an amount sufficient to reduce the viscosity of said solution and to produce a permanent uniform cloudiness throughout the medium, which cloudiness does not dissipate on continuous agitation, but not in an amount sufficient to precipitate said polymer therefrom,
   (2) diluting the blend thus prepared with a further quantity of an organic precipitating agent in an amount sufficient to precipitate the polymer in the form of fine discrete particles,
   (3) separating the solid precipitated polymer from the residual fluid,
   (4) drying the separated polymer, wherein said precipitating agent is at least partially soluble in water, inert to said polymer and in which said polymer is substantially insoluble and wherein said aqueous solution of said precipitating agent is a non-solvent for said polymer at a concentration up to and including saturation.

4. A process for recovering a water-soluble addition polymer of acrylamide from an aqueous solution thereof comprising
   (1) blending said aqueous solution with an organic precipitating agent, at a temperature between about 0° C. and a temperature just below the boiling point of said precipitating agent, in an amount sufficient to reduce the viscosity of said solution and to produce a permanent uniform cloudiness throughout the medium, which cloudiness does not dissipate on continuous agitation, but not in an amount sufficient to precipitate said polymer therefrom,
   (2) diluting the blend thus prepared with a further quantity of an organic precipitating agent in an amount sufficient to precipitate the polymer in the form of fine discrete particles,
   (3) filtering the solid precipitated polymer from the residual fluid, and
   (4) drying the filtered polymer, wherein said precipitating agent is at least partially soluble in water, inert to said polymer and in which said polymer is substantially insoluble and wherein said aqueous solution of said precipitating agent is a non-solvent for said polymer at a concentration up to and including saturation.

5. A process for recovering a water-soluble addition copolymer of acrylamide and acrylic acid from an aqueous solution thereof comprising
   (1) blending said aqueous solution with an organic precipitating agent, at a temperature between about 0° C. and a temperature just below the boiling point of said precipitating agent, in an amount sufficient to reduce the viscosity of said solution and to produce a permanent uniform cloudiness throughout the medium, which cloudiness does not dissipate on continuous agitation, but not in an amount sufficient to precipitate said copolymer therefrom,
   (2) diluting the blend thus prepared with a further quantity of an organic precipitating agent in an amount sufficient to precipitate the copolymer in the form of fine discrete particles, (3) filtering the solid precipitated copolymer from the residual fluid, and (4) drying the filtered copolymer, wherein said precipitating agent is at least partially soluble in water, inert to said copolymer and in which said copolymer is substantially insoluble and wherein said aqueous solution of said precipitating agent is a non-solvent for said copolymer at a concentration up to and including saturation.

6. A process for recovering a water-soluble addition polymer of a polymerizable compound containing a $CH_2=C<$ group from an aqueous solution thereof comprising (1) blending said aqueous solution with acetone, at a temperature between about 0° C. and a temperature just below the boiling point of said acetone, in an amount sufficient to reduce the viscosity of said solution and to produce a permanent uniform cloudiness throughout the medium, which cloudiness does not dissipate on continuous agitation, but not in an amount sufficient to precipitate said polymer therefrom, (2) diluting the blend thus prepared with a further quantity of acetone in an amount sufficient to precipitate the polymer in the form of fine discrete particles, (3) separating the solid precipitated polymer from the residual fluid, and (4) drying the separated polymer.

7. A process for recovering a water-soluble addition polymer of a polymerizable compound containing a $CH_2=C<$ group from an aqueous solution thereof comprising (1) blending said aqueous solution with methanol, at a temperature between about 0° C. and a temperature just below the boiling point of said methanol, in an amount sufficient to reduce the viscosity of said solution and to produce a permanent uniform cloudiness throughout the medium, which cloudiness does not dissipate on continuous agitation, but not in an amount sufficient to precipitate said polymer therefrom, (2) diluting the blend thus prepared with a further quantity of methanol in an amount sufficient to precipitate the polymer in the form of fine discrete particles, (3) separating the solid precipitated polymer from the residual fluid, and (4) drying the separated polymer.

8. A process for recovering a water-soluble addition polymer of acrylamide from an aqueous solution thereof comprising (1) blending said aqueous solution with acetone, at a temperature between about 0° C. and a temperature just below the boiling point of said acetone, in an amount sufficient to reduce the viscosity of said solution and to produce a permanent uniform cloudiness throughout the medium, which cloudiness does not dissipate on continuous agitation, but not in an amount sufficient to precipitate said polymer therefrom, (2) diluting the blend thus prepared with a further quantity of acetone in an amount sufficient to precipitate the polymer in the form of fine discrete particles, (3) separating the solid precipitated polymer from the residual fluid, and (4) drying the separated polymer.

9. A process for recovering a water-soluble addition polymer of acrylamide from an aqueous solution thereof comprising (1) blending said aqueous solution with methanol, at a temperature between about 0° C. and a temperature just below the boiling point of said methanol, in an amount sufficient to reduce the viscosity of said solution and to produce a permanent uniform cloudiness throughout the medium, which cloudiness does not dissipate on continuous agitation, but not in an amount sufficient to precipitate said polymer therefrom, (2) diluting the blend thus prepared with a further quantity of methanol in an amount sufficient to precipitate the polymer in the form of fine discrete particles, (3) separating the solid precipitated polymer from the residual fluid, and (4) drying the separated polymer.

10. A process for recovering a water-soluble addition copolymer of acrylamide and acrylic acid from an aqueous solution thereof comprising (1) blending said aqueous solution with acetone, at a temperature between about 0° C. and a temperature just below the boiling point of said acetone, in an amount sufficient to reduce the viscosity of said solution and to produce a permanent uniform cloudiness throughout the medium, which cloudiness does not dissipate on continuous agitation, but not in an amount sufficient to precipitate said copolymer therefrom, (2) diluting the blend thus prepared with a further quantity of acetone in an amount sufficient to precipitate the copolymer in the form of fine discrete particles, (3) filtering the solid precipitated copolymer from the residual fluid, and (4) drying the filtered copolymer.

11. A process for recovering a water-soluble addition copolymer of acrylamide and acrylic acid from an aqueous solution thereof comprising (1) blending said aqueous solution with methanol, at a temperature between about 0° C. and a temperature just below the boiling point of said methanol, in an amount sufficient to reduce the viscosity of said solution and to produce a permanent uniform cloudiness throughout the medium, which cloudiness does not dissipate on continuous agitation, but not in an amount sufficient to precipitate said copolymer therefrom, (2) diluting the blend thus prepared with a further quantity of methanol in an amount sufficient to precipitate the copolymer in the form of fine discrete particles, (3) filtering the solid precipitated copolymer from the residual fluid, and (4) drying the filtered copolymer.

References Cited in the file of this patent

UNITED STATES PATENTS

| | | |
|---|---|---|
| 2,161,949 | Calcott et al. | June 13, 1939 |
| 2,244,703 | Hubbuch | June 10, 1941 |
| 2,289,540 | Dittmar et al. | July 14, 1942 |
| 2,291,697 | Cox et al. | Aug. 4, 1942 |
| 2,320,536 | Pollack et al. | June 1, 1943 |
| 2,379,237 | Jenkins | June 26, 1945 |
| 2,469,696 | Minsk et al. | May 10, 1949 |
| 2,861,982 | Mino | Nov. 25, 1958 |

OTHER REFERENCES

Schildknecht: Vinyl and Related Polymers, Wiley and Sons (1952), pages 301–306.